United States Patent [19]
Brakebill et al.

[11] 3,930,612
[45] Jan. 6, 1976

[54] HUMIDITY CONTROL SYSTEM AND HUMIDITY RESPONSIVE CONTROL DEVICE THEREFOR

[75] Inventors: Harold G. Brakebill; Jay L. Lewis, both of Concord, Tenn.

[73] Assignee: Robertshaw Controls Company, Richmond, Va.

[22] Filed: Aug. 21, 1974

[21] Appl. No.: 499,315

[52] U.S. Cl................ 236/44 R; 237/87; 73/337.5
[51] Int. Cl.[2]........................................ G05D 22/00
[58] Field of Search............ 236/44 R, 87; 73/337.5

[56] References Cited
UNITED STATES PATENTS

| | | | |
|---|---|---|---|
| 3,373,934 | 3/1968 | Kolbe et al. | 236/87 X |
| 3,452,928 | 7/1969 | Stark | 236/44 R |
| 3,718,280 | 2/1973 | Russell | 236/44 R |
| 3,819,113 | 6/1974 | Puster et al. | 236/47 X |

*Primary Examiner*—William E. Wayner
*Attorney, Agent, or Firm*—Candor, Candor & Tassone

[57] ABSTRACT

A fluid control system being responsive to humidity conditions as sensed by a humidity responsive control device that controls a fluid bleed means of the control system in response to humidity conditions sensed thereby, the humidity responsive control device having a flapper spring lever pivotally carried by a frame in a cantilevered manner and having a free end controlling a bleed valve seat. The flapper spring lever has a normal bias to tend to move the flapper end to one of its pivoted positions relative to the valve seat and is operatively associated with an actuating lever by a spring means, the actuating lever being controlled by a humidity sensing means.

16 Claims, 7 Drawing Figures

3,930,612

HUMIDITY CONTROL SYSTEM AND HUMIDITY RESPONSIVE CONTROL DEVICE THEREFOR

This invention relates to an improved humidity responsive control system as well as to an improved humidity responsive control device.

It is well known that humidity responsive control devices have been provided, each being adapted for controlling a pneumatic control system in response to humidity conditions being sensed by the humidity responsive device.

It is a feature of this invention to provide a pneumatically operated humidity responsive control system wherein the system can be readily converted from a direct acting system to a reverse acting system in a simple and effective manner.

It is also a feature of this invention to provide an improved humidity responsive control device for a pneumatically operated humidity responsive control system or the like.

In particular, one embodiment of this invention provides a fluid control system having a fluid supply means, a fluid operated device, a humidity responsive fluid bleed means a fluid operated relay means all interconnected together in such a manner that the fluid operated relay means will have the branch pressure thereof operate the fluid operated device in relation to the fluid pressure in a pilot chamber of the fluid operated relay means. The humidity responsive fluid bleed means effectively bleeds the pilot chamber of the fluid being supplied thereto in response to humidity conditions being sensed thereby. The system includes a fluid switching means which is adapted to switch the fluid operated relay means from acting as a direct acting relay to one which acts as a reverse acting relay through merely an adjustment of a selector means for the switching means.

The humidity responsive control device of this invention comprises a frame carrying a valve seat means and a flapper spring lever is pivoted cantilevered manner, the flapper lever being provided with a free end for controlling the valve seat means whereby the position of the end relative to the valve seat means determines the degree of fluid flow or bleed through the valve seat means. The flapper spring lever has a normal bias to tend to move the end means thereof to one of its pivoted positions relative to the valve seat means. An actuating lever is pivotally carried by the frame and is interconnected to a humidity responsive means. A spring means is operatively interconnected to the actuating lever and to the end means of the flapper lever to control movement of the end means relative to the valve seat means in relation to pivoting movement of the actuating lever by the humidity responsive means.

Accordingly, it is an object of this invention to provide an improved pneumatically operated humidity responsive control system having one or more of the novel features set forth above or hereinafter shown or described.

Another object of this invention is to provide an improved humidity responsive control device having one or more of the novel features set forth above or hereinafter shown or described.

Another object of this invention is to provide an improved method of making such a humidity responsive control device or the like.

Other objects, uses and advantages of this invention are apparent from a reading of this description, which proceeds with reference to the accompanying drawings forming a part thereof and where:

Figure 1:
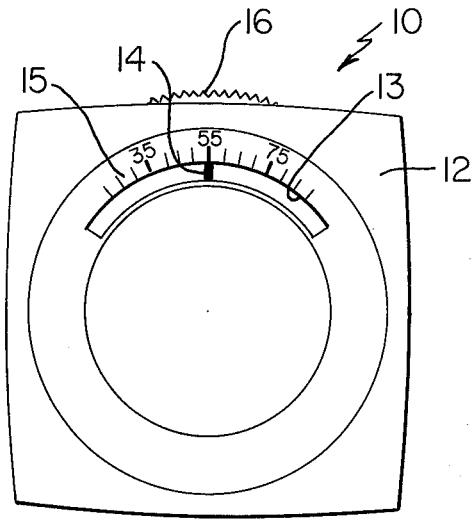
FIG. 1 is a front view of the improved humidity responsive control device of this invention.

While the various features of this invention are hereinafter described and illustrated as being particularly adapted to provide a humidity responsive control system, it is to be understood that the various features of this invention can be utilized singly or in any combination thereof to provide control means for other types of control systems as desired.

Therefore, this invention is not to be limited to only the embodiment illustrated in the drawings, because the drawings are merely utilized to illustrate one of the wide variety of uses of this invention.

Figure 3:
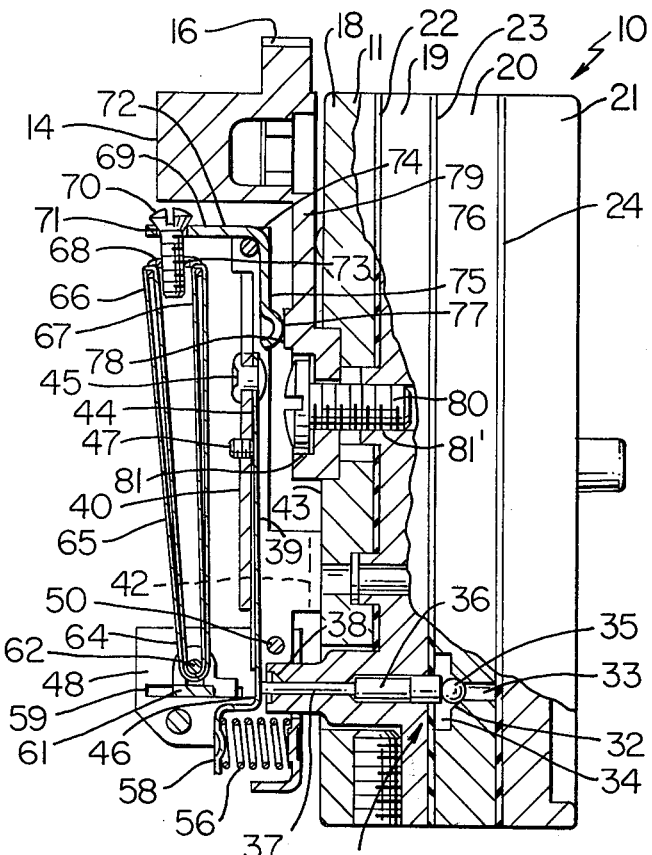
FIG. 3 is a cross-sectional view taken on line 3—3 of FIG. 2.
Figure 2:
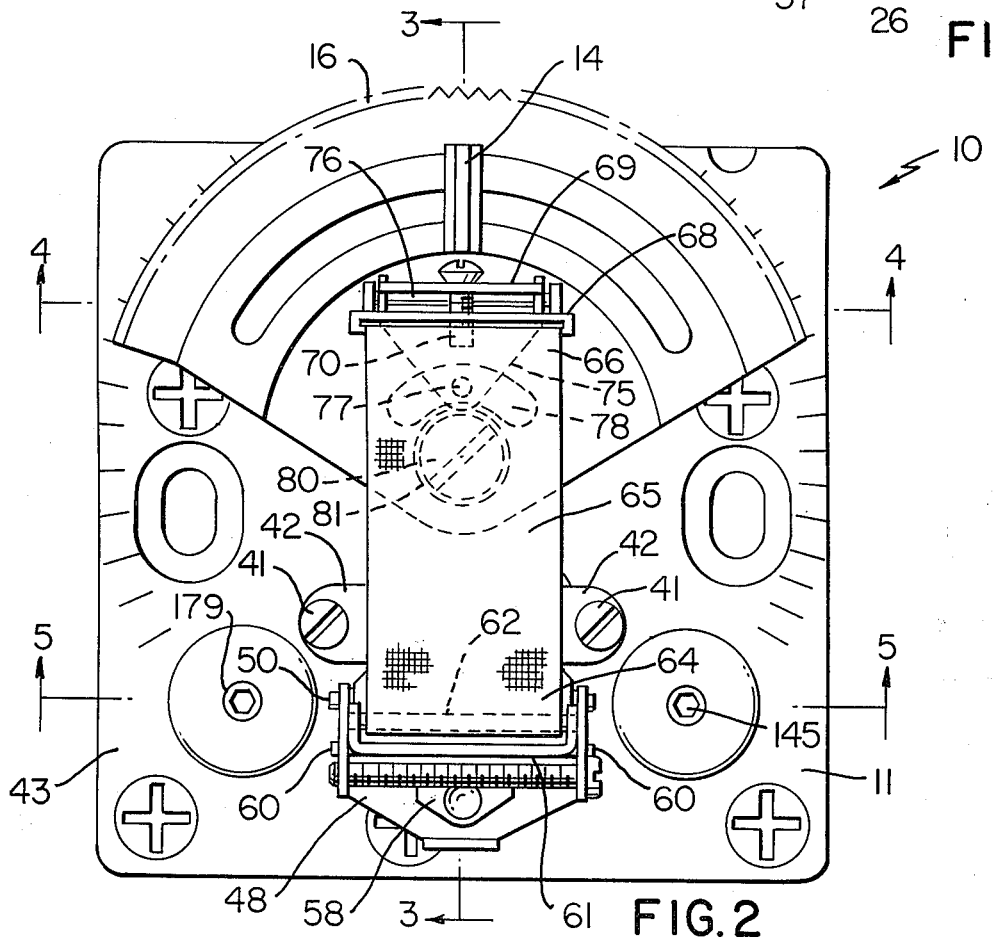
FIG. 2 is an enlarged front view of the control device of FIG. 1 with the front cover thereof removed.

Referring now to FIGS. 1, 2 and 3, the improved humidity responsive control device of this invention is generally indicated by the reference numeral 10 and comprises a frame means 11 carrying a removable front cover 12 having a window 13 therein for exposing an indicator member 14 adjacent a humidity scale 15 on the cover 12 for indicating the humidity setting of the control device 10 as set by manual movement of a selector segment 16 that extends out of the cover 12 as illustrated in FIG. 1 to be operated in a manner hereinafter described.

The humidity responsive control device 10 of this invention is an improvement over the humidity responsive control device disclosed and claimed in U.S. Pat. No. 3,718,280 and packages therein the control system of this invention that is generally indicated by the reference numeral 17 in FIG. 7 in a manner hereinafter described similar to the packaging of the pneumatic control system as set forth in co-pending patent application Ser. No. 308,181 filed Nov. 20, 1972.

Figure 4:
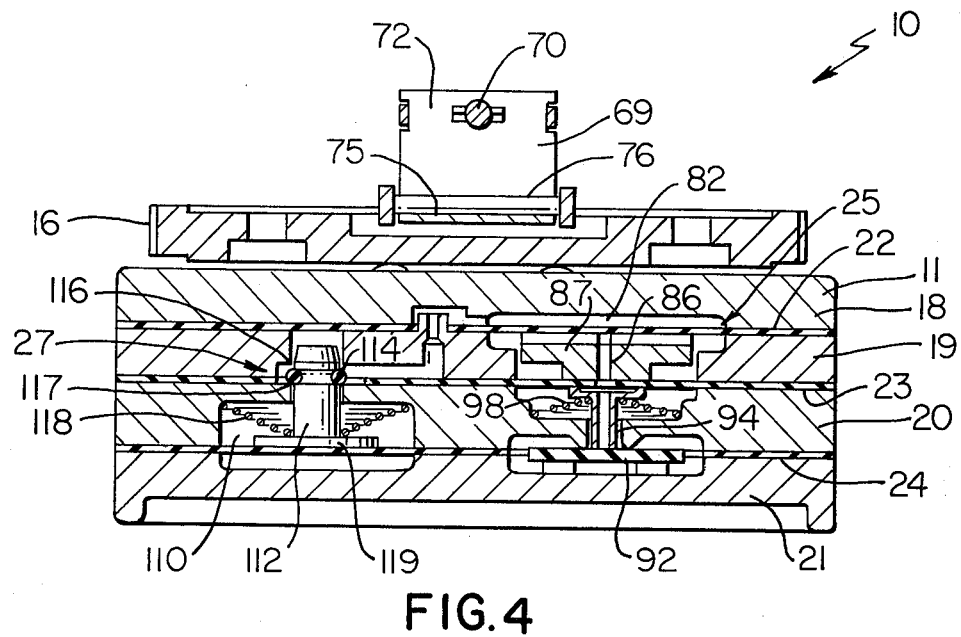
FIG. 4 is a cross-sectional view taken on line 4—4 of FIG. 2.
Figure 5:
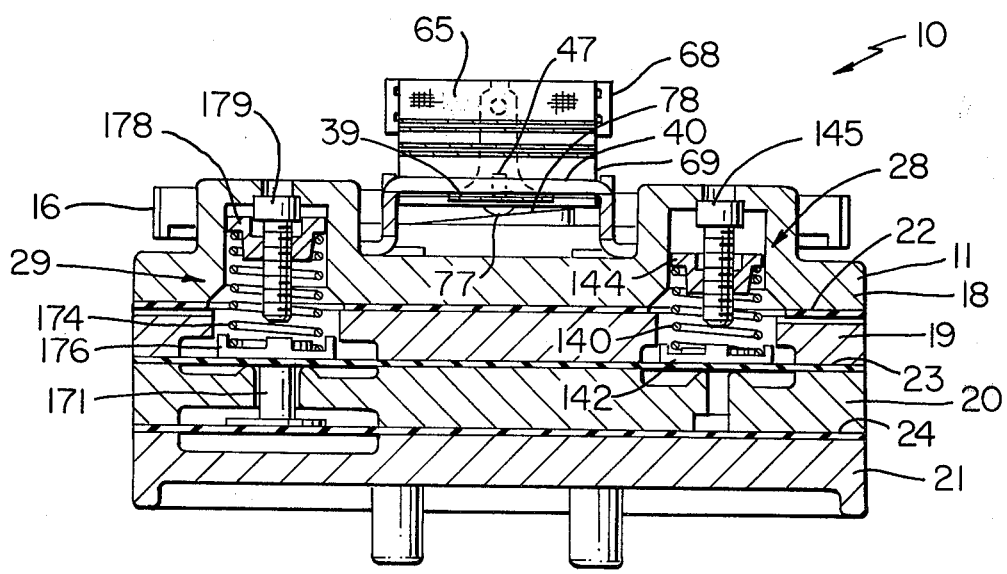
FIG. 5 is a cross-sectional view taken on line 5—5 of FIG. 2.
Figure 7:
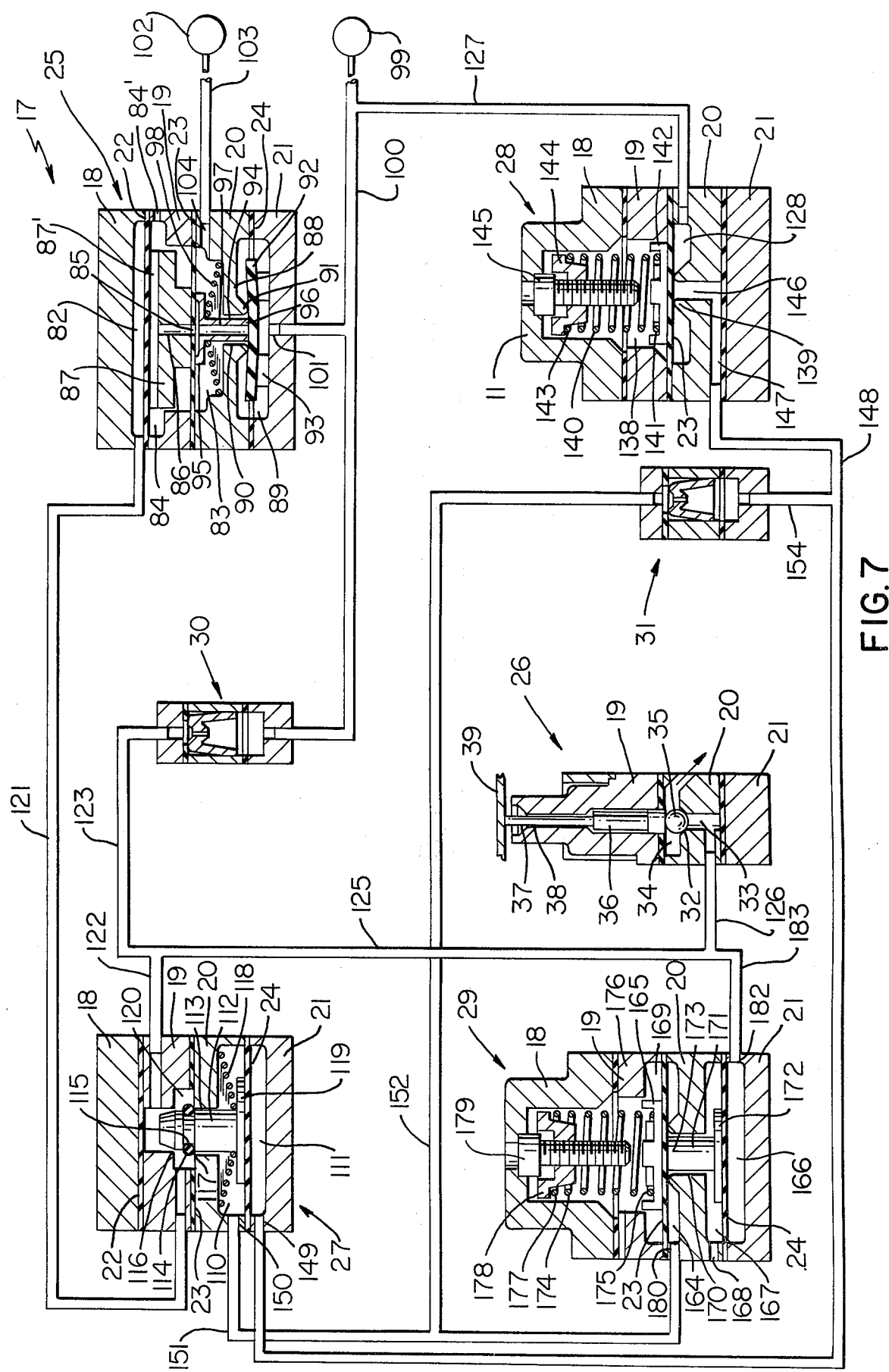
FIG. 7 is a schematic view illustrating the improved pneumatically operated humidity responsive control system of this invention.

In particular, the frame means 11 of the control device 10 includes a plurality of plates 18, 19, 20 and 21 suitably secured together with flexible sealing means 22, 23 and 24 disposed therebetween while being suitably configured and provided with movable parts, channels and chambers to define a relay construction means that is generally indicated by the reference numeral 25 in FIGS. 4 and 7, a fluid ball valve bleed means that is generally indicated by the reference numeral 26 in FIG. 3 and 7, a first switching valve means that is generally indicated by the reference numeral 27 in FIGS. 4 and 7, a second fluid switching valve means that is generally indicated by the reference numeral 28 in FIGS. 5 and 7 and a reversing relay means that is generally indicated by the reference numeral 29 in FIGS. 5 and 7 as well as a pair of restriction means that are generally indicated by the reference numerals 30 and 31 in FIG. 7.

Of course, suitable passage means and ports are provided in the housing means 11 of the control device 10 to include the fluid flow system illustrated in the conduit interconnected manner in FIG. 7 and hereinafter described.

The fluid bleed means 26 as illustrated in FIGS. 3 and 7 includes a valve seat 32 that separates a fluid pressure passage 33 from another passage 34 that leads to the atmosphere as illustrated in FIG. 7 for a purpose hereinafter described, the valve seat 32 being adapted to be opened and closed by a ball valve member 35 that is adapted to be urged toward the valve seat 32 by a plunger means 36 movably carried by the housing means 11 and having a reduced end 37 extending out of an opening 38 of the housing means 11 to be controlled by a flapper spring lever 39 of the control device 10 in a manner hereinafter described whereby the net spring force of the lever 39 acting on the plunger 36 tends to seat the valve member 35 against the valve seat 32 in opposition to the force of the pressure fluid in the passage 33 as will be apparent hereinafter. Thus, the pressure of the fluid in the passage 33 is adapted to be maintained at a certain pressure level, depending upon the net spring force of the lever 39 acting on the plunger 36 in a direction to tend to close the ball valve member 35 against the valve seat 32 so that the amount of resulting fluid bleed through the valve seat 32 maintains the pressure of the fluid in the passage 33 proportional to the particular net spring force of the lever 39 presently acting on the ball valve member 35 as will be apparent hereinafter.

Figure 6:
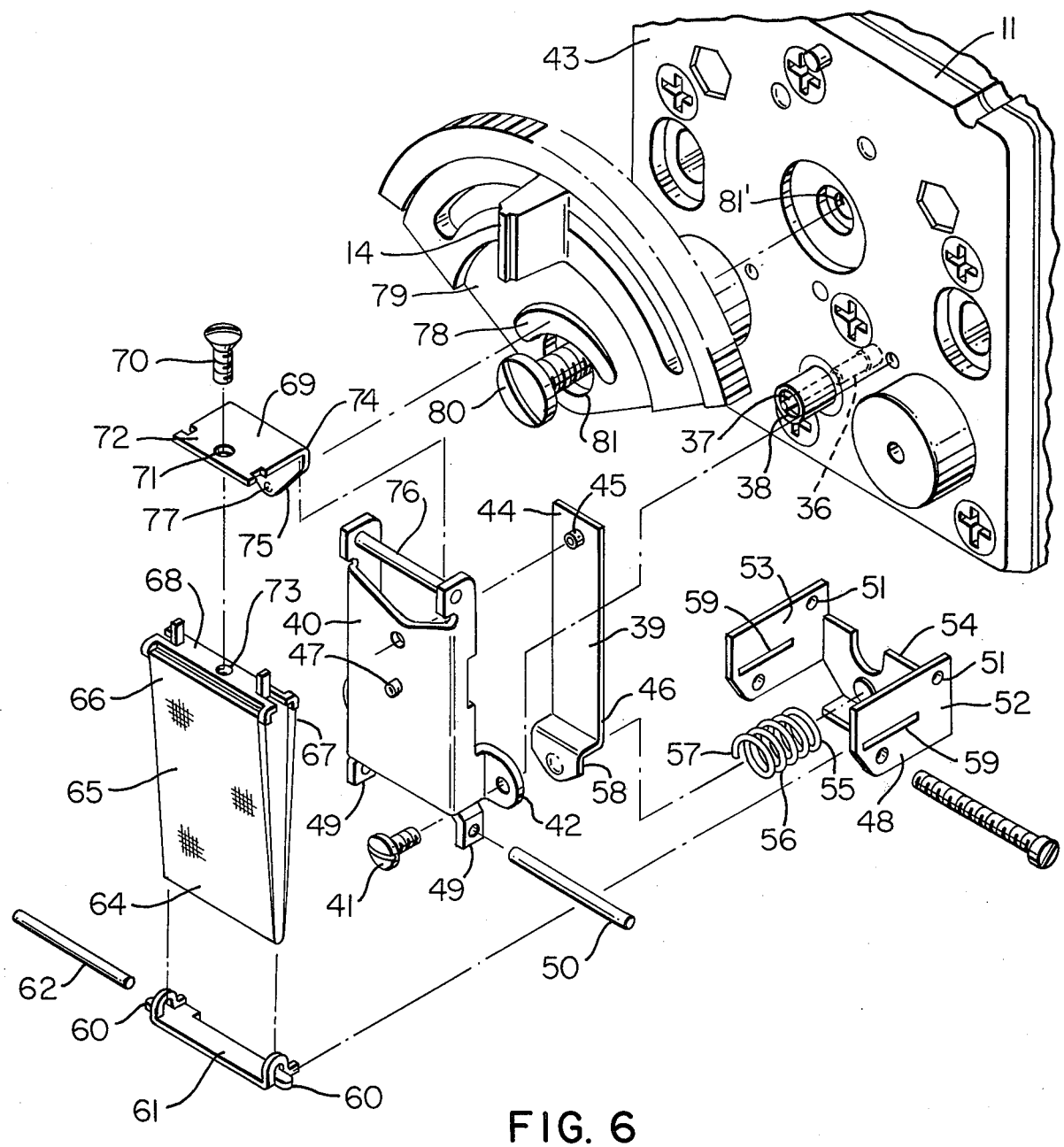
FIG. 6 is an exploded perspective view of various parts of the control device of FIG. 2.

As illustrated in FIGS. 3 and 6, a rigid bracket 40 is fastened by fastening means 41 through ears 42 thereof to the top or front surface 43 of the housing means 11 so as to be in a fixed position relative thereto. One end 44 of the flapper spring lever 39 is fastened by rivet means 45 to the bracket 40 in spaced relation from the top surface 43 of the housing 11 so that the flapper lever 39 is mounted in cantilevered fashion to the frame means 11 with the end 46 thereof being a free end and being engageable with the end 37 of the plunger means 36 as illustrated in FIG. 3, the lever 39 being given a normal bias in a direction to tend to urge the plunger means 36 toward the valve seat 32 by an adjusting member 47 threadedly carried by the bracket 40 and engaging against the flapper lever 39 intermediate the ends 44 and 46 thereof as illustrated in FIG. 3 so that the normal factory set spring force of the lever 39 acts in a direction to tend to close the valve seat 32. Thus, this spring force of the lever 39 can be adjusted by the member 47.

An actuating lever 48 is pivotally mounted to ears 49 of the fixed bracket 40 by a pivot pin 50 disposed in suitable openings 51 in side parts 52 and 53 of the actuating lever 48, the actuating lever 48 having a cross member 54 holding the side parts 52 and 53 together and receiving one end 55 of a compression spring 56 thereon. The other end 57 of the compression spring is disposed against an L-shaped tank 58 of the free end 46 of the flapper lever 39 as illustrated in FIG. 3 whereby the force of the compression spring 56 acts on the free end 46 of the lever 39 in opposition to the natural bias of the lever 39 to tend to move the end 46 thereof in a direction away from valve seat 32 for a purpose hereinafter described.

The side parts 52 and 53 of the actuating lever 48 have aligned slots 59 therein which are respectively adapted to receive ears 60 of a retainer 61 that carries a roller 62 having opposed ends disposed in ears 62 of the member 61 and around which one end 64 of a continuous nylon ribbon 65 is looped to fasten that end 64 of the ribbon 65 to the actuating lever 48. In this manner, the retainer 61 can slide relative to the lever 48 as the ears 60 of the retainer 61 move up and down in the slots.

The other parts 66 and 67 of the looped ribbon 65 are respectively fastened to a retainer 68 which is threadedly connected to an L-shaped lever 69 by a threaded fastening member 70 passing through an opening 71 in one arm 72 of the L-shaped lever 69 and being received in a threaded bore 73 of the retainer 68 in the manner illustrated in FIG. 3. The L-shaped arm or lever 69 defines an elbow 74 between the arm 72 thereof and the other arm 75 thereof with the elbow 74 being adapted to engage against a roller or pin 76 carried by the fixed bracket 40 in the manner illustrated in FIG. 3 so that a cam follower 77 on the arm 75 of the L-shaped lever 69 will bear against a cam track 78 on a selector member 79 pivotally mounted to the frame means 11 by a threaded fastening member 80 passing through an opening 81 in the selector member 79 and being threadedly received in a threaded bore 81' in the housing means 11. The selector member 79 contains the indicator 14 and gear section portion 16 previously described.

In this manner, the position of the retainer 68 relative to the frame 11 is controlled by the angular position of the L-shaped arm 69 as determined by the particular part of the cam track 78 bearing against the cam follower 77 of the arm 68 as set by selector portion 16 of the selector member 79. Thus, it can be seen in FIG. 3 that the retainer 68 can be moved to the right or the left in FIG. 3, depending upon the position of the selector member 79 and such leftward and rightward movement thereof will cause pivoting movement of the actuating lever 48 on its pivot pin 50 and, thus, an increase or decrease in the compression force of the spring 56 acting on the end 46 of the flapper lever 39 to thereby adjust the humidity setting of the humidity responsive control device 10 to operate in a manner hereinafter described.

Accordingly, it can be seen that when the selector plate 79 is set so that the indicator 14 provides a desired humidity setting adjacent the scale 15 of the cover 12, such as 55 illustrated in FIG. 1, the cam 81 has acted on the end 77 of the lever 69 to position the retainer 68 for the ribbon 65 in a certain position thereof so that the actuating lever 48 has been likewise pivoted to a certain position to cause the spring 56 to act against the end 46 of the flapper lever 39 with a certain force in opposition to the natural bias of the flapper lever 39. Thus, when the relative humidity being sensed by the nylon ribbon 65 is at the setting of the selector plate 79, the net force of the spring lever 39 acting on the ball 35 for the valve seat means 32 is such that the pressure of the fluid pressure in the passage 33 is bleed so as to be maintained at a pressure that will tend to maintain the humidity adjacent the ribbon 65 and 55. Accordingly, should the humidity condition fall below the setting of 55, the ribbon 65 contracts and thereby shortens between the retainers 68 and 61 to cause the actuating lever 48 to pivot in a clockwise direction in FIG. 3 to thereby increase the force of the compression spring 56 acting upwardly on the flapper lever 39 and, thus, increase the bleed through the valve seat 32 as the net force of the spring lever 39 acting on the ball 35 is decreased. Conversely, an increase in the humidity condition being sensed by the ribbon 65 causes the same to elongate and, thus, cause the force of the compression spring 56 to pivot the actuating lever 48 in a counterclockwise direction whereby the force of the spring 56 acting on the lever 39 is decreased. Thus, the net spring force of the lever 39 increases and tends to move the ball valve 35 closer to the valve seat 32 and, thus, decreases the bleed through the valve seat 32 so that the control system will tend to increase the humidity output adjacent the control device 10 as the fluid pressure in the passage now increases.

The control system 17 of this invention utilizing the control device 10 will now be described and reference is made to FIG. 7.

As illustrated in FIG. 7, the relay means 25 is a direct acting relay which means as the fluid pressure in a pilot chamber 82 thereof increases, the fluid pressure in a branch chamber 83 thereof will likewise increase whereas, conversely, as the fluid pressure in the pilot chamber 82 decreases, the fluid pressure in the branch chamber 83 correspondingly decreases.

The relay means 25 is of the type disclosed and claimed in the U.S. Pat. to Puster et al, No. 3,575,190, with certain improvements being made therein in the manner set forth in the aforementioned co-pending patent application, Ser. No. 308,181, whereby only the details of the relay means 25 necessary to understand the features of the present invention will be described, with the understanding that for further information of the same, reference can be made to the aforementioned U.S. Pat. No. 3,575,190, and co-pending patent application Ser. No. 308,181.

The gasket or sealing means 22 of the relay 25 cooperates with the housing plates 18 and 19 to define the pilot chamber 82 and an exhaust chamber 84 on opposite sides thereof. Similarly, the gasket or flexible sealing means 23 defines the exhaust chamber 84 and branch chamber 83 on opposite sides thereof except that the diaphragm 23 has an opening 85 passing therethrough and aligned with an opening 86 passing through a spacer 87 disposed between the diaphragm members 22 and 23 and having a cross passage 87' therein always interconnecting the passage 86 and, thus, the opening 85 and the diaphragm 23 to the exhaust chamber 84.

The housing plate 20 has a wall 88 that separates the branch chamber 83 from a main chamber 89 and is provided with an opening 90 passing therethrough which defines a valve seat 91 projecting into the main chamber 89. A flexible valve member or disc 92 is disposed in the main chamber 89 and has its outer peripheral portion supported on a plurality of outwardly directed embossments or extensions 93 formed on the housing plate 21 so as to cause the central portion of the valve member 92 to be slightly bowed downwardly while being held in sealed relation against the valve seat 91 to normally close the valve seat 91 from the main chamber 89 and, thus, the main chamber 89 from the branch chamber 83.

A movable valve member 94 is disposed in the branch chamber 83 and has opposed ends 95 and 96 respectively adapted to be disposed in engagement with the diaphragm 23 outboard of the opening 85 thereof and with the central part of the valve disc 92. The end 95 of the valve member 94 has an annular valve seat thereon which surrounds the opening 85 of the diaphragm 23 and the end 96 of the valve member 94 is adapted to project through the opening 90 in the wall 88 of the plate 20 to engage against the central part of the valve member 92. The valve member 94 has an opening 97 passing therethrough in aligned relation with the opening 85 of the diaphragm 23 and is adapted to be closed at the end 96 by the valve disc 92 when disposed thereagainst in the manner illustrated in FIG. 7. A compression spring 98 is disposed in the branch chamber 83 and has one end bearing against the wall 88 while the other end bears against the valve member 94 at the end 95 thereof to tend to maintain the end 95 thereof in engagement with the diaphragm 23 at all times as will be apparent hereinafter as the diaphragm 23 is moved relative to the housing means 11.

A fluid supply means 99 is adapted to be interconnected by a conduit means or passage means 100 to an opening 101 formed in the housing plate 21 and leading to the main chamber 89.

The branch chamber 94 is adapted to be interconnected to a pneumatically operated device 102 by a passage means or conduit means 103 interconnected to an opening 104 in the plate 20 that leads to the branch chamber 84.

The pneumatically operated device 102 can be associated to control pneumatic valves or dampers associated with humidifying or dehumidifying equipment as desired.

All of the structure and passages illustrated in FIG. 7 are adapted to be packaged in the control device 19 with the exception of the supply source 99 and the device 102 as well as the passages leading therefrom to the control device 10.

The switching valve 27 has the diaphragm means 24 defining two chambers 110 and 111. A valve member 112 is loosely disposed in an internal passage means 113 formed in the housing plates 19 and 20 and carries an O-ring 114 in an annular groove 115 formed therein to respectively cooperate with upper and lower valve seats 116 and 117 formed on the housing plates 19 and 20 at the passage means 113. A compression spring 118 bears against a button member 119 of the valve member 112 to normally tend to maintain the O-ring 114 thereof against the valve seat 117 and, thus, prevent fluid communication between the chamber 110 and the valve seat 116 through the passage means 113.

An annular space 120 is defined between the valve seats 116 and 117 in the switching valve 27 and is interconnected by a conduit or passage means 121 to the pilot chamber 82 of the relay means 25. The valve seat 116 is adapted to interconnect the annular space 120 of the switching valve 27 to a passage means 122 that is interconnected to a conduit 123 that has the restrictor means 30 disposed therein, the restrictor means 30 interconnecting the conduit 123 with the conduit 100 that interconnects the fluid supply means 99 with the main chamber 89 of the relay 25.

Thus, as long as the switching valve 27 is in the condition illustrated in FIG. 7, so that the valve seat 117 is closed by the valve member 112 and the valve seat 116 is, thus, being maintained open by the valve member 112, the fluid supply means 99 is interconnected through the restrictor 30 and opened valve seat 116 to the conduit 121 and, thus, to the pilot chamber 82 of the relay valve 25.

The conduit 123 intermediate the restrictor means 30 and the switching valve 27 is interconnected by a conduit 125 to a branch conduit 126 leading to the passage 33 of the humidity responsive fluid bleed means 26 so that the fluid bleed means 26 is adapted to bleed the pilot chamber 82 in response to the humidity condition being sensed by the ribbon 65 to operate the relay means 25 as will be apparent hereinafter.

The main conduit 100 leading from the fluid supply means 99 is interconnected to a branch conduit 127 that leads to a chamber 128 of the fluid operated valve means 28.

The fluid operated valve means 28 has the flexible diaphragm 23 separating the chamber 128 from an atmospheric chamber 138 formed in the housing 11. The housing member 20 is provided with a valve seat 139 that projects into the chamber 128 and is normally closed by the diaphragm 23 under the urging of a compression spring 140 having one end 141 thereof bearing against a back-up member 142 of the diaphragm 23 and the other end 143 thereof bearing against a spring retainer 144 threadedly mounted on a threaded adjusting member 145 of the housing means 11. Thus, the force of the compression spring 140 tending to urge the diaphragm 23 in its closing engagement against the valve seat 139 can be adjusted by the adjusting member 145. The force of the compression spring 140 is such at one setting of the member 145 that the diaphragm 23 maintains the valve seat 139 completely closed so that the switching valve 27 will remain in the position illustrated in FIG. 7.

However, when the member 145 is set in another setting thereof, the pressure of the fluid being directed by the conduit 127 into the chamber 128 acts against the underside of the diaphragm 23 in opposition to the force of the compression spring 140 to urge the same upwardly and open the valve seat 139. As the diaphragm 23 begins to open the relatively large annular valve seat 139, the effective surface area of the diaphragm 23 being influenced by the fluid pressure in the chamber 128 almost immediately increases to a larger more effective area to cause the diaphragm 23 to snap open from the valve seat 139 and, thus, interconnect the chamber 128 with a passage 146 leading from the valve seat 139 to a cross passage 147 in the housing plate 20 to a conduit means 148. This snap opening effect of the diaphragm 23 prevents any adverse oscillaing in the opening movement thereof.

The conduit 148 leads to an opening 149 in the housing plate 21 of the switching valve 27, the opening 149 leading to the chamber 111. Thus, when the snap acting valve means 28 opens the valve seat 139 upon the member 145 being set to its other setting to decrease the force of the spring 143 below the force of the supply fluid, such pressure fluid from the source 99 is now directed into the chamber 111 to act upwardly on the diaphragm 24 in FIG. 7 and readily overcomes the force of the compression spring 118 to drive the valve member 112 upwardly to open the valve seat 117 and close the valve seat 116 until the fluid pressure in the chamber 111 is released by the switching means 28 being switched back to its one setting by adjustment of the member 145 thereof.

Thus, it can be seen that once the snap acting valve means 28 opens its valve seat 139 to cause the switching valve means 27 to switch from the position illustrated in FIG. 7 to a position where the valve seat 116 is closed and the valve seat 117 is open, the fluid supply means 99 is no longer interconnected to the pilot chamber 82 of the relay 25 through the valve seat 116.

However, the pilot chamber 82 of the relay means 25 is supplied fluid pressure from the source 99 through the opened valve seat 117 of the switching valve 27 in a manner now to be described.

The chamber 110 of the switching valve 27 is interconnected by an opening 150 in the housing plate 20 to a conduit 151 which is interconnected by a branch conduit 152 to the restrictor means 31, the restrictor means 31 interconnecting the conduit 152 to a branch conduit 154 that leads to the main conduit 148 so that when the switching valve 28 is set to have its valve seat 139 opened, the pressure fluid from the source 99 is interconnected through the opened valve means 28, conduit 148, branch conduit 154, restrictor means 31, branch conduit 152, conduit 151, chamber 110 and the opened valve seat 117 of the switching valve 27 to the conduit 121 that leads to the pilot chamber 82.

The humidity responsive fluid bleed means 26 is adapted to effectively cause bleeding of the pilot chamber 82 of the relay means 25 through the use of the reversing relay means 29 when the fluid supply means 99 is supplying its fluid into the system 17 through the opened valve seat 139 of the switching valve 28.

The reversing relay means 29 has the flexible diaphragm 23 separating a chamber 164 in the housing plate 20 from an atmosphere chamber 165 formed in the housing plates 18 and 19 and the diaphragm 24 separating a chamber 166 from an exhaust chamber 167 formed in the housing plate 20 and being interconnected to the atmosphere through an exhaust port 168. The housing plate 20 has a valve seat 169 projecting into the chamber 164 to be opened and closed by the diaphragm means 23 with the valve seat 169 having a passage 170 therethrough for leading to the exhaust chamber 167. A stem member or separator 171 is disposed in the exhaust chamber 167 and has a bottom end 172 bearing against the diaphragm 24 while an upper end 173 thereof projects loosely through the opening 170 of the housing plate 20 and the valve seat 169 to engage against the diaphragm 23 as illustrated.

A compression spring 174 is disposed in the atmospheric chamber 165 of the reversing relay means 29 and has one end 175 thereof bearing against a backup plate 176 for the diaphragm 23 and the other end 177 thereof bearing against a spring retainer 178 threadedly mounted on a threaded adjusting member 179 carried by the housing means 18. Thus, the force of the compression spring 174 tending to maintain the diaphragm means 23 in its closed position against the valve seat 169 can be adjusted by the adjusting member 179 in a manner well known in the art.

The chamber 164 of the reversing relay means 29 is interconnected by a port 180 to the conduit 151 whereby the chamber 164 of the reversing relay means 29 is interconnected to the chamber 110 of the switching valve means 27.

The chamber 166 of the reversing relay means 29 is interconnected by a port 182 to a conduit 183 that leads to the branch conduit 126 of the humidity responsive fluid bleed means 26 whereby the humidity responsive fluid bleed means 26 controls the pressure value of the fluid in the chamber 166 that is adapted to be supplied fluid pressure from the source 99 as the conduit 183 is also interconnected to the conduit 125.

The operation of the system 17 will now be described.

As previously stated, when the switching valve 28 has its member 145 set to maintain the valve seat 139 closed, the switching valve 27 is in the position illustrated in FIG. 7 whereby the humidity responsive fluid bleed means 26 controls the fluid pressure in the pilot chamber 82 by effectively bleeding the pressure in the pilot chamber 82 directly out through the valve seat 32 thereof.

In particular, it will be assumed that the device 102 will have its humidity output effect decreased as the fluid pressure being supplied thereto from the branch chamber 83 increases and the flapper lever 39 tends to move downwardly toward the ball valve 35 with a greater spring force as the ribbon 65 senses increasing humidity and with a lesser spring force as the ribbon 65 senses a decreasing humidity from a set humidity setting of the selector plate 79 of the device 10.

Accordingly, it can be seen that the fluid supply means 99 is adapted to supply fluid pressure to the main chamber 89 as well as through the restrictor 30 and open valve seat 117 of the valve means 27 to the pilot chamber 82 of the relay 25 whereby as the fluid pressure in the pilot chamber 82 builds up, the same also acts in the passage means 33 of the humidity responsive fluid bleed means 26 to tend to open the ball valve member 35 away from the valve seat 32 and, thus, bleed the fluid pressure in the pilot chamber 82 to the atmosphere. However, opening movement of the valve member 35 is opposed by the net spring force of the flapper lever 39 and spring 56 such that the net spring force of the flapper lever 39 and spring 56 urging the ball valve 35 against the valve seat 32 decreases as the humidity sensed by the ribbon 65 decreases from the set humidity setting thereof and, conversely, the net spring force of the flapper lever 39 and spring 56 increases to hold the valve member 35 against the valve seat 32 as the humidity of the ribbon 65 increases from the set humidity setting thereof. Thus, there is adapted to be more fluid bleeding through the ball valve means 32, 35 as the humidity decreases and less fluid bleeding as the humidity increases.

As the pressure of the fluid in the pilot chamber 82 increases, the same acts downwardly on the diaphragm 22, and through the separator member 87, on the diaphragm 23 and, thus, on the valve member 94 to urge the same downwardly against the natural bias of the valve disc 92 to tend to open the central portion of the valve disc 92 from the valve seat 91 and, thus, interconnect the main chamber 89 with the branch chamber 83 to thereby increase the pressure value of the pressure fluid in the branch chamber 83. Conversely, as the pressure in the pilot chamber 82 decreases, the pressure in the branch chamber 83 acting upwardly on the diaphragm 23 moves the diaphragm 23 upwardly and since the spring 98 is holding the valve member 94 against the diaphragm 23, the valve member 94 moves upwardly in unison therewith to permit the valve disc 92 to be disposed against the valve seat 91 and, thus, disconnect the main chamber 89 from the branch chamber 83. Further, upward movement of the diaphragm 23 causes the valve member 94 to move the end 96 thereof away from the valve disc 92 so as to open the end 96 of the valve member 94 and permit the fluid pressure in the branch chamber 83 to exhaust through the opening 97 of the valve member 94, opening 85 of the diaphragm 23 and passages 86 and 87' of the separating member 87 to pass out to the atmosphere through the opening 84' formed in the housing plate 19 and leading from the exhaust chamber 84 to the atmosphere.

Thus, should the humidity effect produced by the device 102 be at the level of the particular setting of the selector 79, the relay means 25 will assume the satisfied position illustrated in FIG. 7 wherein both the exhaust chamber 84 and main chamber 89 are disconnected from the branch chamber 83 and with the branch chamber 83 providing its output branch signal at a pressure level to maintain the device 102 at the particular operating condition thereof because the pressure in the pilot chamber 82 remains at a pressure level to maintain the relay means 25 in the satisfied condition illustrated in FIG. 7 as the humidity responsive fluid bleed means 26 is bleeding the chamber 82 at a rate that is constantly being resupplied by the supply means 99 through the restrictor means 30.

However, should the humidity output effect of the device 102 fall below the desired humidity output effect setting of the selector 79 of the device 10, the ribbon 65 will contract and decrease the net spring force of the flapper lever 39 acting on the ball 35 and thereby increase the amount of bleed through the valve seat 32 so that the fluid pressure in the pilot chamber 82 will decrease as the fluid pressure therein will not be replaced at a sufficiently rapid rate through the restrictor means 30 whereby the force of the pressure fluid in the branch chamber 83 will act upwardly on the diaphragm 23 and move the diaphragm 23 upwardly, and, thus, open the end 96 of the valve member 94 to interconnect the branch chamber 83 to the exhaust chamber 84. Thus, the pressure in the branch chamber 83 is decreased to cause the device 102 to increase its humidity output effect until the ribbon 65 again senses that the humidity output effect is now correct and maintains the ball valve member 35 in a manner to bleed the chamber 82 at a rate to maintain the relay means 25 in the satisfied condition illustrated in FIG. 7.

Conversely, should the humidity output effect of the device 102 increase beyond the set humidity output effect of the selector 79, the ribbon 65 will elongate and thus increase the net spring force of the flapper lever 39 acting on the ball valve member 35 and thus decreases the amount of fluid bleed through the valve seat 32 whereby the fluid pressure in the pilot chamber 82 correspondingly increases. The increase in fluid pressure in the pilot chamber 82 moves the diaphragms 22 and 23 downwardly and through the valve member 94 moves the central portion of the valve disc 92 away from the valve seat 91 to permit main pressure from the chamber 89 to enter into the branch chamber 83 through now opened valve seat 91 and, thus, increase the force of the pressure in the branch chamber 83. This increase in the force in the pressure value of the fluid in the branch chamber 83 causes the device 102 to decrease its humidity output effect so that the ribbon 65 will eventually decrease in the humidity thereof and thereby contract so that the ball valve member 35 will again bleed the pilot chamber 82 in such a manner that the relay means 25 will again return to the satisfied condition illustrated in FIG. 7 whereby the device 102 will produce the necessary humidity output effect to maintain the ribbon 65 in the satisfied condition illustrated in FIG. 7.

Therefore, it can be seen that the control system 17 of this invention operates in such a manner that the pilot chamber 82 thereof has its fluid pressure bled in accordance with the humidity condition being sensed by the humidity responsive means 26 to operate the pneumatically operated device 102 in relation to the particular pressure value existing in the pilot chamber 82.

However, when the system 17 is to be utilized in a reverse manner where the device dehumidifies rather than humidifies as previously described, the operator adjusts the member 145 of the switching valve 28 to cause the supply fluid to open the valve seat 139 thereof so that the humidity responsive fluid bleed means 26 will cause bleeding of the pressure in the pilot chamber 82 through the reversing relay means 29 as the bleed through the valve seat 32 of the humidity responsive fluid bleed means 26 is for the purpose of bleeding the chamber 166 of the reversing relay means 29 and the valve seat 169 of the reversing relay means 29 directly bleeds the pilot chamber 82 of the relay means 25 in relation to the bleeding of the chamber 166 thereof by the humidity responsive fluid bleed means 26.

In particular, when the switching valve means 28 has the member 145 adjusted, the pressure level of fluid is directed into the conduit 127 by the supply means 99 is such that the same opens the diaphragm 23 of the snap acting valve means 28 in the manner previously described so that the supply pressure fluid is directed to the chamber 111 of the switching valve 27 to cause the valve member 112 to move upwardly to close the valve seat 116 and open the valve seat 117 whereby the conduit 123 is no longer interconnected to the pilot chamber 82 of the relay means 25. However, the fluid pressure in the conduit 100 does pass through the restrictor 30 and through the branch conduits 123 and 125 to the conduits 126 and 183 respectively leading to the fluid bleed means 26 and chamber 166 of the reversing relay means 29. The fluid pressure now being supplied into the conduit 148 from the open valve seat 139 of the snap acting fluid operated valve means 28 now passes through the restrictor 31 and conduits 152 and 151 respectively to the chambers 110 and 164 of the switching valve 27 and the reversing relay 29. The fluid pressure being supplied into the chamber 110 of the switching valve 27 is interconnected through the opened valve seat 117 to the conduit 121 and, thus, to the pilot chamber 82 of the relay 25. Since this pressure in the chamber 110 is also interconnected to the chamber 164 of the reversing relay 29 which has its valve seat 169 opened and closed by the diaphragm member 23 which is normally urged to its closed position by the compression spring 174, pressure now in the chamber 166 and acting on the diaphragm 24 and through the separator 171 opens the diaphragm 23 away from the valve seat 169 to bleed the chamber 164 and, thus, the pilot chamber 82 of the relay means 25.

Thus, should the dehumidifying output temperature effect of the device 102 satisfy the humidity setting of the selector 79 of the device 10 so that the ribbon 65 causes the ball valve member 35 to cause a bleeding through the valve seat 32 thereof at such a rate that the fluid pressure being supplied to the chamber 166 through the restrictor 30 maintains the diaphragm 23 to bleed fluid through the valve seat 169 at such a rate that the replacement of the pressure fluid being supplied thereto through the restrictor means 31 causes the fluid pressure of the pilot chamber 82 of the relay 25 to maintain the relay means 25 in the satisfied condition illustrated in FIG. 7, the dehumidifying output effect of the device 102 remains constant as the fluid pressure in the branch chamber 83 remains constant in the manner previously described.

However, should the humidity being sensed by the ribbon 65 increase over the setting thereof, the net spring force of the flapper lever 39 on the ball 32 decreases to increase the bleed of fluid through the valve seat 32 and, thus, decrease the force of the pressure fluid in the chamber 166 of the reversing relay means 29 and thereby cause less bleeding through the valve seat 169 so that the fluid pressure in the chamber 110 now increases and, thus, now increases in the pilot chamber 82 to cause a corresponding increase in the branch pressure chamber 83 by connecting the main chamber 89 to the branch chamber 83 in the manner previously described. This increase in the pressure in the branch chamber 83 causes the device 102 to increase its dehumidifying effect to tend to cause the ribbon 65 to again sense the lower desired humidity condition.

Should the ribbon 65 sense a lower humidity output effect than the humidity setting effect thereof, the ribbon 65 contracts and causes the flapper lever 39 to move the valve member 35 downwardly with a greater spring force so that the bleed through the valve seat 32 is decreased and, thus, causes an increase in the pressure in the chamber 166 of the reversing relay 29. This increase in the fluid pressure in the chamber 166 of the reversing relay 29 causes a greater bleeding of the chamber 164 thereof to the exhaust chamber 167 and, thus, a lowering of pressure in the pilot chamber 82 of the relay 25. A decrease in the pressure in the pilot chamber 82 causes a lowering of pressure in the branch chamber 83 by having the branch chamber 83 interconnected to the exhaust chamber 84 as previously described whereby the decrease in branch pressure causes the device 102 to decrease its dehumidifying effect and thereby tend to cause the ribbon 65 to again sense the set humidity in the manner previously described.

Therefore, it can be seen that the control system 17 of this invention is adapted to cause the switching valve 27 to switch the control system 17 from a reverse acting arrangement of the condition responsive fluid bleed means 26 to a direct acting arrangement by merely changing the setting of member 145 of the switching valve 28. However, in either situation, the condition responsive fluid bleed means 26 directly or indirectly affects the bleeding of the pilot chamber 82 in response to the humidity condition being sensed by the humidity responsive fluid bleed means 26 to control the fluid operated device 102 interconnected to the branch chamber 83 of the relay 25.

When the system 17 has been operating with the switching valve 28 having its valve seat 139 open, the operator can readily switch the system 17 back to the condition where the valve seat 139 is closed by merely changing the setting of the member 145 and, thus, the force of the spring 140 so that the valve seat 139 is again closed by the diaphragm 23.

Once the diaphragm 23 has closed against the vlave seat 139, no more fluid pressure will be directed through the snap acting valve means 28 to the chamber 111 of the switching valve means 27.

Thus, the fluid pressure now trapped in the chamber 111 of the switching valve means 27 is vented to the atmosphere back through the conduit 148, conduit 154, restrictor means 31, conduit 152, conduit 151, and the chamber 164 of the reversing relay means 29 to be bled through the valve seat 169.

Once the fluid pressure in the chamber 111 of the switching valve means 27 has been bled down to a level where the compression spring 118 can move the valve member 112 downwardly to the position illustrated in FIG. 7 to close off the valve seat 117 and again open the valve seat 116, the system 117 is then automatically switched back to a reverse acting system for operating the device 102 in the humidifying mode thereof because the conduit 123 is now interconnected through the valve seat 116 to the conduit 121 so that the pilot chamber 82 of the relay means 25 is directly under the control of the bleed through the valve seat 32 of the humidity responsive fluid bleed means 26 in the manner previously described.

Thus, it can be seen that it is a simple matter to switch the system 17 between the humidifying cycle of operation and the dehumidifying cycle of operation thereof because it merely requires changing the setting of the spring 140 of the switching valve 28.

Therefore, it can be seen that this invention not only provides an improved fluid control system and control device therefor, but also this invention provides an improved method of operating such a fluid control system and making of such a control device.

While the forms of this invention now preferred have been disclosed and described as required by the Patent Statutes, it is to be understood that other forms can be utilized and still come within the scope of the appended claims.

What is claimed is:

1. A fluid pressure transmitter comprising frame means, valve seat means carried by said frame means, a flapper spring lever pivotally carried by said frame means in a cantilevered manner and having a free end means for controlling said valve seat means whereby the position of said end means relative to said valve seat means determines the degree of fluid flow through said valve seat means, said flapper spring lever having a normal bias to tend to move said end means thereof to one of its pivoted positions relative to said valve seat means, an actuating lever pivotally carried by said frame means, a condition responsive means operatively interconnected to said actuating lever to pivot said lever in relation to the condition sensed thereby, and a compression spring disposed between and engaging said actuating lever and said end means of said flapper lever to control movement of said end means relative to said valve seat means in relation to pivoting movement of said actuating lever by said condition responsive means.

2. A fluid pressure transmitter as set forth in claim 1 wherein said condition responsive means is a humidity sensor.

3. A fluid pressure transmitter as set forth in claim 2 wherein said humidity sensor comprises an expandible and contractible ribbon having opposed end means one of which is interconnected to said actuating lever and the other end means being operatively interconnected to said frame means.

4. A fluid pressure transmitter as set forth in claim 3 wherein an adjustable selector means is carried by said frame means and operatively interconnects said other end means of said ribbon to said frame means.

5. A fluid pressure transmitter as set forth in claim 4 wherein an adjustable lever is pivotally carried by said frame means and comprises part of said ajustable selector means.

6. A fluid pressure transmitter as set forth in claim 5 wherein said actuating lever is operatively interconnected to said adjustable lever by said ribbon, said selector means including a movable cam for moving said adjustable lever.

7. A fluid pressure transmitter as set forth in claim 1 wherein a movable valve member is disposed adjacent said valve seat means, said end means of said actuating lever being operatively associated with said valve member to position the same relative to said valve seat means.

8. A fluid pressure transmitter as set forth in claim 7 wherein said valve member comprises a ball valve member, said frame means carrying a movable plunger disposed between said end means of said flapper lever and said ball valve member to operate the same.

9. In a fluid pressure control system comprising a source of pressure fluid, a fluid pressure operated device, and passage defining means interconnecting said source to said device, the improvement comprising a fluid pressure transmitter having a frame means, valve seat means carried by said frame means and being in fluid communication with said passage defining means, a flapper spring lever pivotally carried by said frame means in a cantilevered manner and having a free end means for controlling said valve seat means whereby the position of said end means relative to said valve seat means determines the degree of fluid flow through said valve seat means, said flapper spring lever having a normal bias to tend to move said end means thereof to one of its pivoted positions relative to said valve seat means, an actuating lever pivotally carried by said frame means, a condition responsive means operatively interconnected to said actuating lever and to said end means of said flapper lever to control movement of said end means relative to said valve seat means in relation to pivoting movement of said actuating lever by said condition responsive means, and a compression spring disposed between and engaging said actuating lever and said end means of said flapper lever to control movement of said end means relative to said valve seat means in relation to pivoting movement of said actuating lever by said condition responsive means.

10. In a fluid pressure control system as set forth in claim 9, the further improvement wherein said condition responsive means is a humidity sensor.

11. In a fluid pressure control system as set forth in claim 10, the further improvement wherein said humidity sensor comprises an expandible and contractible ribbon having opposed end means one of which is interconnected to said actuating lever and the other end means being operatively interconnected to said frame means.

12. In a fluid pressure control system as set forth in claim 11, the further improvement wherein an adjustable selector means is carried by said frame means and operatively interconnects said other end means of said ribbon to said frame means.

13. In a fluid pressure control system as set forth in claim 12, the further improvement wherein an adjustable lever is pivotally carried by said frame means and comprises part of said adjustable selector means.

14. In a fluid pressure control system as set forth in claim 13, the further improvement wherein said actuating lever is operatively interconnected to said adjustable lever by said ribbon, said selector means including a movable cam for moving said adjustable lever.

15. In a fluid pressure control system as set forth in claim 9, the further improvement wherein a movable valve member is disposed adjacent said valve seat means, said end means of said actuating lever being operatively associated with said valve member to position the same relative to said valve seat means.

16. In a fluid pressure control system as set forth in claim 15, the further improvement wherein said valve member comprises a ball valve member, said frame means carrying a movable plunger disposed between said end means of said flapper lever and said ball valve member to operate the same.

* * * * *